(12) United States Patent
Scheich

(10) Patent No.: US 11,412,135 B2
(45) Date of Patent: Aug. 9, 2022

(54) BOWL-SHAPED PHOTOGRAPHIC STAGE

(71) Applicant: Davo Scheich, Troy, MI (US)

(72) Inventor: Davo Scheich, Troy, MI (US)

(73) Assignee: OVAD CUSTOM STAGES, LLC, Troy, MI (US)

( * ) Notice: Subject to any disclaimer, the term of this patent is extended or adjusted under 35 U.S.C. 154(b) by 106 days.

(21) Appl. No.: 16/210,304

(22) Filed: Dec. 5, 2018

(65) Prior Publication Data

US 2020/0186708 A1 Jun. 11, 2020

(51) Int. Cl.
| | |
|---|---|
| *H04N 5/247* | (2006.01) |
| *H04N 5/232* | (2006.01) |
| *G03B 15/07* | (2021.01) |
| *H04N 5/225* | (2006.01) |

(52) U.S. Cl.
CPC ......... *H04N 5/23238* (2013.01); *G03B 15/07* (2013.01); *H04N 5/2251* (2013.01); *H04N 5/2256* (2013.01); *H04N 5/23203* (2013.01); *H04N 5/247* (2013.01)

(58) Field of Classification Search
CPC ............. H04N 5/23238; H04N 5/2251; H04N 5/2256; H04N 5/23203; H04N 5/247; G03B 15/07
USPC .......................................................... 348/37
See application file for complete search history.

(56) References Cited

U.S. PATENT DOCUMENTS

| | | | | |
|---|---|---|---|---|
| 2011/0080487 | A1* | 4/2011 | Venkataraman | H04N 9/045 348/218.1 |
| 2011/0102744 | A1* | 5/2011 | Saad | G03B 17/00 352/243 |
| 2014/0235362 | A1* | 8/2014 | Fox | H04R 27/00 472/75 |
| 2016/0100087 | A1* | 4/2016 | Scheich | H04N 5/2256 348/47 |
| 2017/0264936 | A1* | 9/2017 | Depies | G06T 19/006 |
| 2018/0160019 | A1 | 6/2018 | Scheich | |
| 2019/0244336 | A1* | 8/2019 | Wakisaka | G06T 7/001 |
| 2019/0253701 | A1* | 8/2019 | Himel | G01S 7/497 |

* cited by examiner

Primary Examiner — Nguyen T Truong

(74) Attorney, Agent, or Firm — Blue Filament Law PLLC

(57) ABSTRACT

A bowl-shaped photographic stage and photographic system is provided that produces consistent diffused lighting of an object or subject that is virtually shadow free for obtaining rotational views of the object in a time efficient manner. The bowl-shaped photographic stage may be used with a camera array, or a single camera may be moved around the circumference of the photographic stage to obtain a series of images needed to form a rotational view of an object or subject. Alternatively, the bowl-shaped photographic stage may be rotated to pass by a single fixed camera to obtain a series of images needed to form a rotational view of an object or subject.

20 Claims, 7 Drawing Sheets

(a)      (b)

(c)      (d)

(e)      (f)

(g)      (h)

(i)　　　　　　　　　(j)

(k)　　　　　　　　　(l)

(m)　　　　　　　　　(n)

(o)　　　　　　　　　(p)

(a)

(b)

(c)

(d)

(e)

(f)

BOWL-SHAPED PHOTOGRAPHIC STAGE

FIELD OF THE INVENTION

The present invention generally relates to the field of photography, and more specifically to a new and useful photographic stage for multi-directional photographs of an object or subject.

BACKGROUND OF THE INVENTION

Internet based commerce has grown exponentially in recent years, and has increased the need for improved images of items that are being offered for sale. Unlike traditional store based transactions where a consumer may be able to see and touch an actual item for sale in three-dimensions, pictures of items for sale on the Internet are typically only two-dimensional static representations or photographs.

Software is available that allows a user to rotate objects up to 360 degrees on a screen to gain a three-dimensional perspective of an item. In order to produce images of an actual object to be rotated with these rotational software packages, multiple still pictures or frames of the object must be taken or generated from various angles, or the object must be repositioned multiple times in front of an image capture device or camera. Furthermore, proper illumination of the object to be photographed must be maintained at all angles. The object to be photographed should be uniformly lit from all directions without glare and with minimal shadowing.

A camera array is a formation of multiple cameras that are networked to a controller to capture an image simultaneously or in a synchronized order from each individual camera perspective or angle. When the images or captured frames are edited together many types of photographic and video effects may be obtained. For example, when the cameras in an array are triggered simultaneously and the captured frame images are edited together a moment in time appears frozen as a viewer is moved around the composite image. Alternative, the image may be rotated in three-dimensional space with the aforementioned software applications. In addition to the frozen moment additional special effects include stop-start, slow motion, time ramp, among other popular special effects.

A problem associated with camera array shots is obtaining consistent diffused lighting of an object that is virtually shadow free. Large photographic stages such as disclosed in U.S. patent application Ser. No. 15/834,374 filed on Dec. 7, 2017 entitled Vehicle Photographic Chamber provides for rotational viewing of a photographed vehicle with optimized lighting of the vehicle. However, such large photographic stages are not suited for smaller items.

Thus there exists a need for a photographic stage that provides consistent diffused lighting of an object that is virtually shadow free for obtaining rotational views of the object in a time efficient manner.

SUMMARY OF THE INVENTION

A photographic system includes a concave circular bowl-shaped photographic stage that holds an object to be photographed. The system further includes a light diffusing screen that casts omni-directional light on the circular concave or bowl-shaped photographic stage, the light diffusing screen suspended above the concave circular bowl-shaped photographic stage. One or more lamps positioned above the light diffusing screen supply the light to be diffused. The system further includes an array of cameras positioned about a perimeter of the concave circular bowl-shaped photographic stage, as well as a computer based controller that individually fires the cameras that form the array. The computer based controller obtains and stores a photographic image as each of the cameras in the array takes an image of the object.

A method of using the photographic system as described includes setting up a number of cameras in the camera array based on the required resolution of a rotational view to be obtained, and positioning the object to be photographed in the center of the concave circular bowl-shaped photographic stage, taking the photographs, and supplying the photographs to a software package to form the rotational image.

BRIEF DESCRIPTION OF THE DRAWINGS

The present invention is further detailed with respect to the following drawings that are intended to show certain aspects of the present invention, but should not be construed as a limit on the practice of the present invention.

DETAILED DESCRIPTION OF THE INVENTION

Figure 1A:
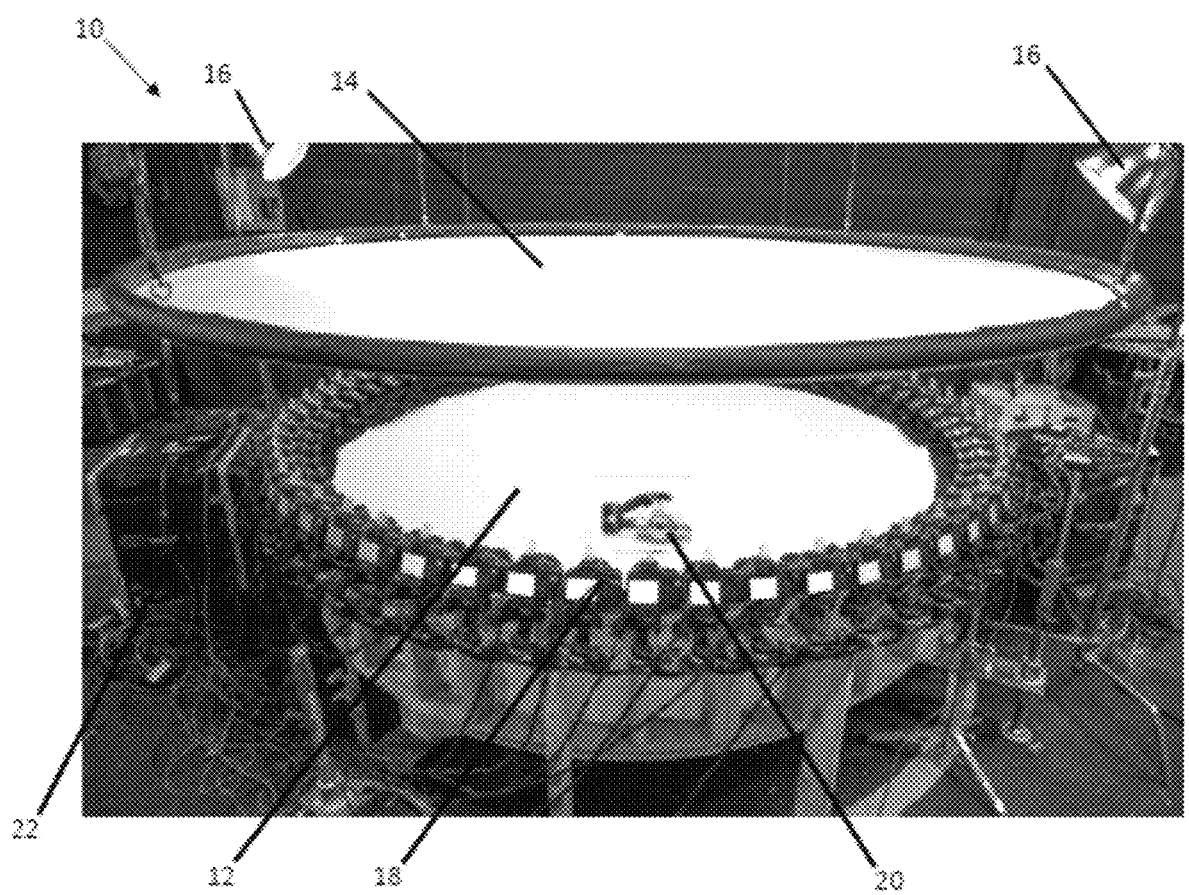
FIG. 1A is photographic view of a photographic system with an upper light diffuser and a bowl-shaped concave photographic stage surrounded by a camera array in accordance with an embodiment of the invention.

The present invention has utility as a concave circular bowl-shaped photographic stage and photographic system that provides consistent diffused lighting of an object or subject that is virtually shadow free for obtaining rotational views of the object or subject in a time efficient manner. The following description of various embodiments of the invention is not intended to limit the invention to these specific embodiments, but rather to enable any person skilled in the art to make and use this invention through exemplary aspects thereof.

It is to be understood that in instances where a range of values are provided that the range is intended to encompass not only the end point values of the range but also intermediate values of the range as explicitly being included within the range and varying by the last significant figure of the range. By way of example, a recited range from 1 to 4 is intended to include 1-2, 1-3, 2-4, 3-4, and 1-4.

As used herein, the term bowl shaped is intend to include a spherical dome, a hemispherical dome, and as well an elliptical dome formed by a plane intersecting an ovoid.

Embodiments of the inventive photographic system provide for a series of photographs to be taken of an object or subject that allows a user to rotate objects or subjects up to 360 degrees on a display screen to gain a three-dimensional perspective of the target. It is appreciated the word target as used herein refers to both physical objects as well as living subjects such as fashion models or animals. In specific inventive embodiments, the series of photographs may be used to for photogrammetry that builds three-dimensional objects from a series of photographic angles. In order to produce images of an actual object or subject to be rotated with a rotational software package, multiple still pictures or frames of the object or subject must be taken or generated from various angles, or the target must be repositioned multiple times in front of an image capture device or camera. Furthermore, proper illumination of the object or subject to be photographed must be maintained at all angles. The object or subject to be photographed should be uniformly lit from all directions without glare and with minimal shadowing.

The uniform lighting and minimal shadowing is obtained in embodiments of the invention with an inventive circular concave or bowl-shaped photographic stage that is uniformly lit from above by a diffusing screen. The concave shape of the photographic bowl provides omni-directional lighting to the object to be photographed, thereby evenly illuminating the object placed in the center of the bowl-shaped stage. The surface of the bowl is made of a light reflecting material that bounces the diffused light from the diffusing screen toward the object to be photographed. The light reflecting material may be a light scattering sheet material such as a white canvas or gray walls, or a hard surface painted with a reflective paint. It is appreciated that in addition to diffused lighting, direct lighting may also be used in specific inventive embodiments as a direct accent light depending on the product being photographed. A further advantage provided by embodiments of the inventive photographic bowl in addition to even lighting is the creation of a white background at all angles without the need to mask the product or use of a green screen. It should be noted that existing systems use heavy backlight and Plexiglas turntables, and while this works fine for some products it becomes very problematic for certain products. The endless white background provided by embodiments of the inventive photographic bowl does not depend on supplemental lighting.

Embodiments of the inventive circular concave or bowl-shaped photographic stage may be a stationary stage that is surrounded by a camera array to obtain the multiple photographic perspective shots to form a rotatable image of an object, or a single camera may be moved about the outer perimeter of the photographic stage to obtain the series of photographs to form the rotatable image. Alternatively, the circular concave or bowl-shaped photographic stage may rotate with a single camera in a fixed position camera taking pictures of the object as the object rotates with the stage. In a specific inventive embodiment, the entire bowl-shaped photographic stage may be tilted in relationship to the cameras so that the playback of the obtained series of photographs provides an image with an elliptical orbit. An advantage of tilting the bowl-shaped photographic stage is that it is much quicker then positioning a camera array in an elliptical path and the stage can be varied between shots.

A further advantage provided by embodiments of the inventive circular concave or bowl-shaped photographic stage is the ability to walk around and see all angles of an object or subject to be photographed prior to photographing the 360 degree image. It is very simple to adjust the lighting for optimal photography without worrying about glare or flare as would be the case when rotating a reflective product.

In a specific inventive embodiment, an extending center column positioned at the base of the circular concave or bowl-shaped photographic stage may be used to keep the center of mass of an object in the center of the frame no matter the size of the object to be photographed. Thus for example, a hand held tool or a large household appliance may be positioned and photographed using an embodiment of bowl-shaped photographic stage.

Referring now to the figures, FIG. 1A is photographic view of a photographic system 10 with an upper light diffuser 14 and a circular concave or bowl-shaped photographic stage 12 surrounded by a camera array 18. The upper light diffuser 14 is lit by one or more lamps 16 that cast omni-directional light on the circular concave or bowl-shaped photographic stage 12. The perimeter of the photographic stage 12 is surrounded by a camera array 18. The camera array 18 is controlled by a computer 22 that individually fires the cameras that form the array 18, and obtains and stores the photographic images as each of the cameras 18n take an image of the object 20 placed in the center of the circular concave or bowl-shaped photographic stage 12.

Figure 1B:
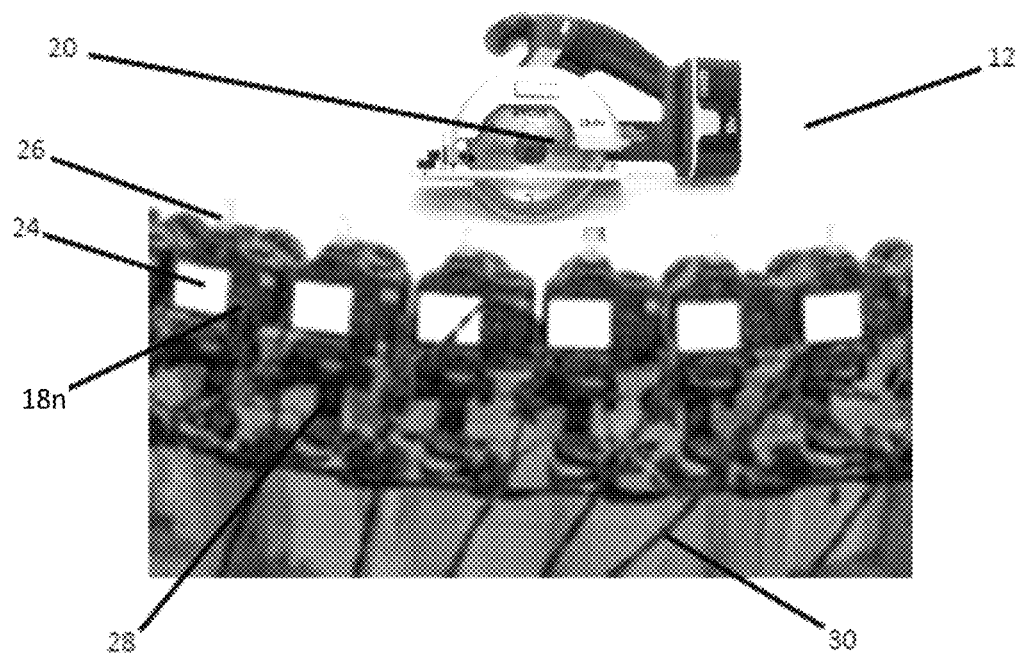
FIG. 1B is a detailed close-up view of FIG. 1A showing the camera array and the bowl-shaped photographic stage surrounded by the camera array in accordance with an embodiment of the invention.

FIG. 1B is a detailed close-up view of FIG. 1A showing the camera array 18 and the bowl-shaped photographic stage 12 surrounded by the camera array 18. As shown, each camera 18n that forms the camera array 18 may have an information and field of view screen 24 that may be used to set up, align, and focus each camera 18n. Each camera 18n may have a flash 26 which may be triggered when a photograph is taken by that camera in the array. Each of the cameras 18n may have a data and control cable 30 that tethers each camera 18n to the computer controller 22. It is appreciated that information may be sent and received from each camera wirelessly. Each camera 18n may have a mount 28 to fix the camera 18n in the array. As shown the object 20 being photographed is a circular saw.

Figure 2A:
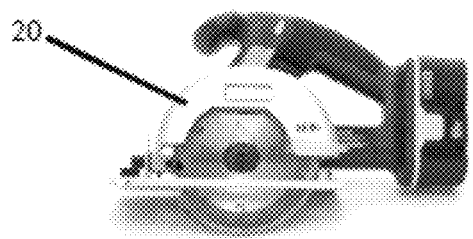
FIG. 2A is a series of photographs (a-p) of the rotation of a circular saw, the photographs taken with the system of FIG. 1A in accordance with embodiments of the invention.
Figure 2A:
Figure 2A:
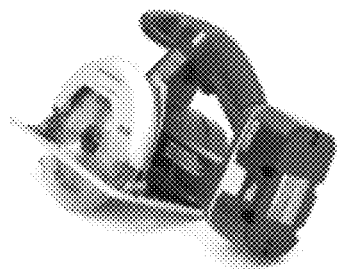
Figure 2A:
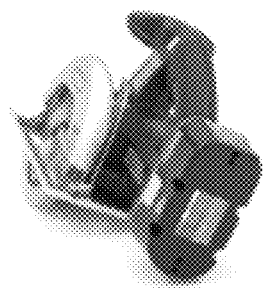
Figure 2A:
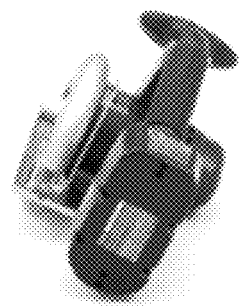
Figure 2A:
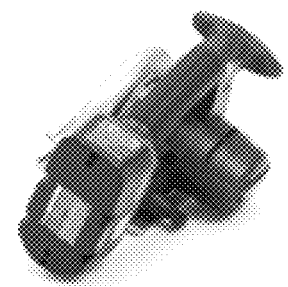
Figure 2A:
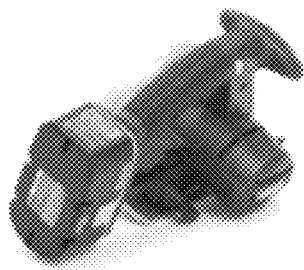
Figure 2A:
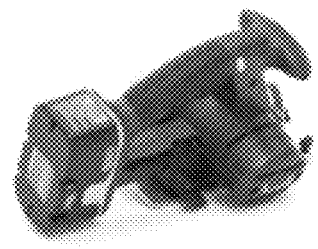
Figure 2A:
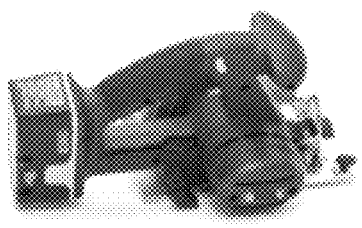
Figure 2A:
Figure 2A:
Figure 2A:
Figure 2A:
Figure 2A:
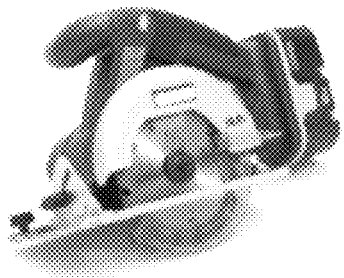
Figure 2A:
Figure 2A:
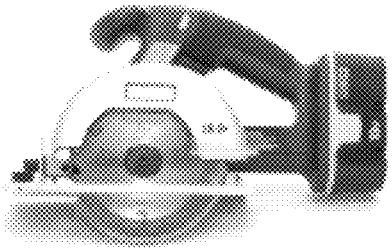

FIG. 2A is a series of photographs (a-p) of the rotation of a circular saw, the photographs taken with the system of FIG. 1A. It should be appreciated that the resolution shown in FIG. 2A of the rotation of the object 20 is low for illustrative purposes and corresponds to just 15 camera (18n) angles. However, if images from all 60 cameras 18n shown in FIG. 1A are used, a nearly seamless rotation of the object 20 would be observed by a user with rotational software on a display screen. As clearly shown, the individual images (a-p) are evenly light with virtually no shadowing that would obscure image details.

Figure 2B:
FIG. 2B is a series of photographs (a-f) of rotational views of a live model taken with the system of FIG. 1A in accordance with embodiments of the invention.
Figure 2B:
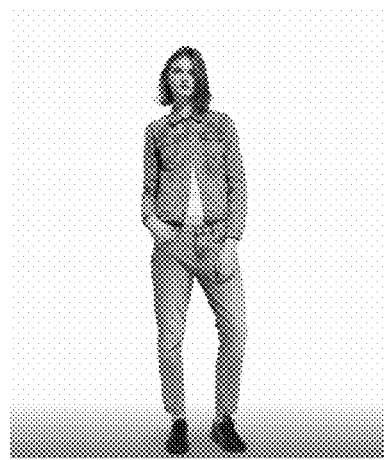
Figure 2B:
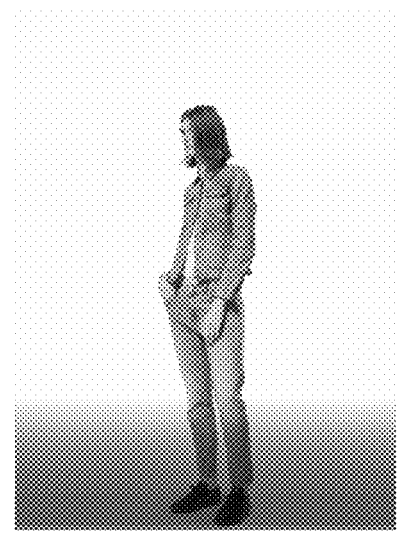
Figure 2B:
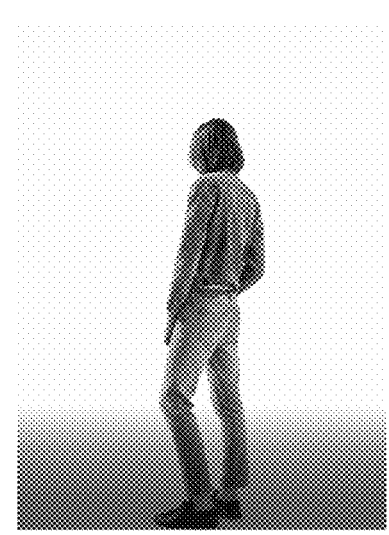
Figure 2B:
Figure 2B:

FIG. 2B is a series of photographs (a-f) of rotation views of a live model, the photographs taken with the system of FIG. 1A. It should be appreciated that the resolution shown in FIG. 2B of the rotation of the live model is low for illustrative purposes and corresponds to just six camera (18n) angles. However, if images from all 60 cameras 18n shown in FIG. 1A are used, a nearly seamless rotation of the live model would be observed by a user with rotational software on a display screen. As clearly shown, the individual images (a-f) are evenly light with virtually no shadowing that would obscure image details.

Figure 3:
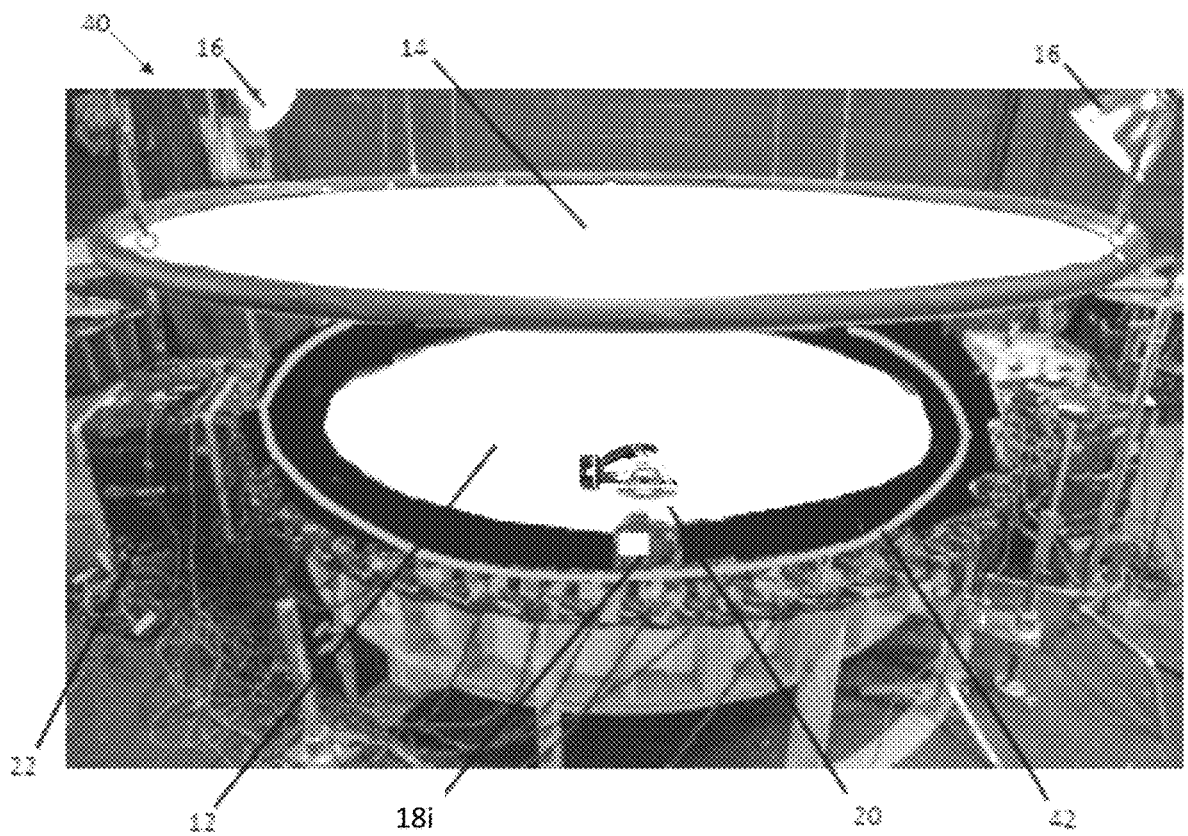
FIG. 3 is a photographic view of a photographic system with an upper light diffuser and a bowl-shaped concave photographic stage with a single movable track mounted camera in accordance with an embodiment of the invention.

FIG. 3 is a photographic view of a photographic system 40 with an upper light diffuser 14 and a bowl-shaped concave photographic stage 12 with a single movable track mounted camera 18i. The camera 18 is moved along the track 42 in order to gain the different perspective angles of the object 20 for forming a series of photographs that form the rotational view of the object 20. The camera may be mounted to a motor (not shown) for travel along the circumferential track 42. The travel motor may be automatically controlled by the computer controller 22 to position the camera 18i in each position along the track 42, where the number of stopping points is defined by the required resolution of the rotational view to be formed from the series of images taken by the camera 18i. The camera 18i may have a wired or wireless connection to the computer controller 22.

Figure 4:
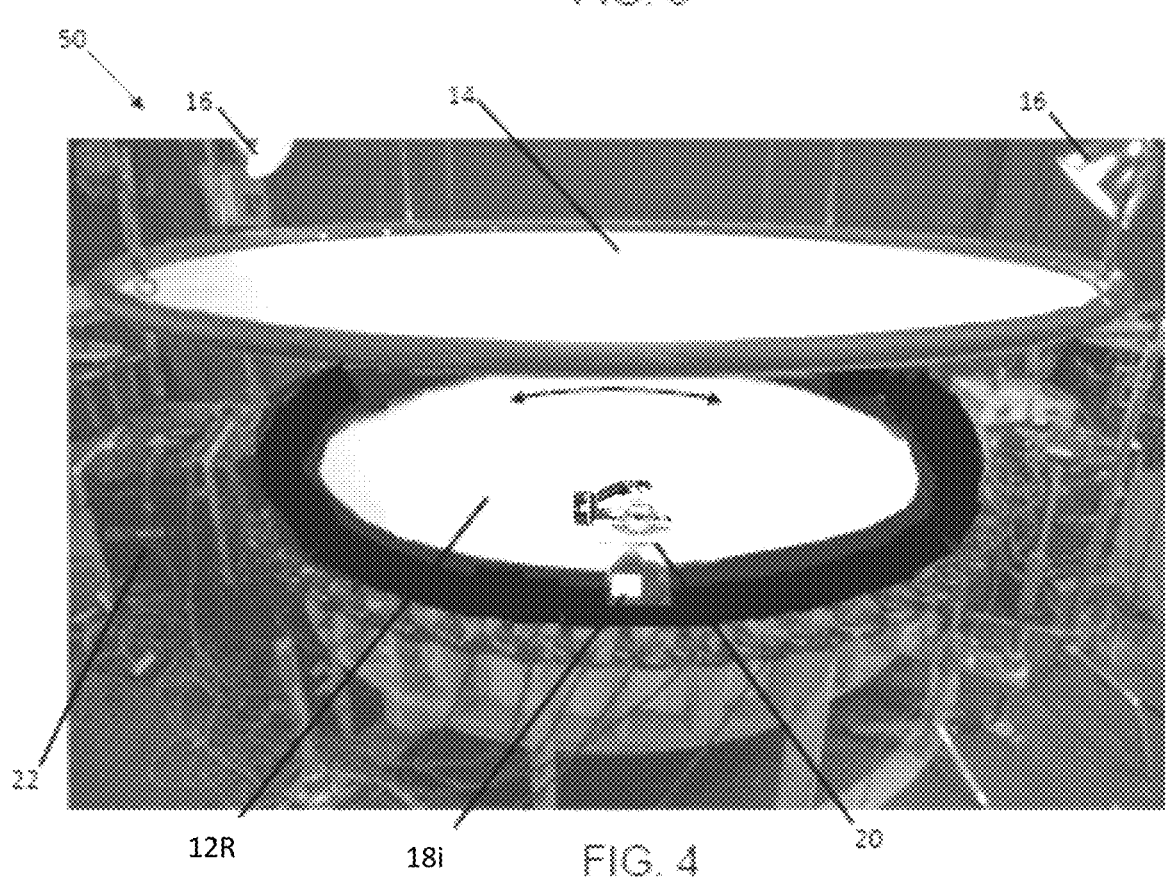
FIG. 4 is a photographic view of a photographic system with an upper light diffuser and a rotating bowl-shaped concave photographic stage with a single stationary camera in accordance with an embodiment of the invention.

FIG. 4 is a photographic view of a photographic system 50 with an upper light diffuser 14 and a rotating bowl-shaped concave photographic stage 12R with a single stationary track mounted camera 18i. The bowl-shaped concave photographic stage 12R is rotated about its center axis, with the object 20 to be photographed resting in the center at the center axis of the stage 12R. The rotation of the stage 12R and of the object 20 allows the single fixed camera 18i to gain the different perspective angles of the object 20 for forming a series of photographs that form the rotational view of the object 20. The rotating bowl-shaped concave photographic stage 12R may be mounted to a motor (not shown) for rotational movement. The motor may be automatically controlled by the computer controller 22 to rotate the stage 12R in different incremental positions in relation to the fixed camera 18i, where the number of stopping points is defined by the required resolution of the rotational view to be formed form the series of images taken by the camera 18i. The camera 18i may have a wired or wireless connection to the computer controller 22.

Figure 5A:
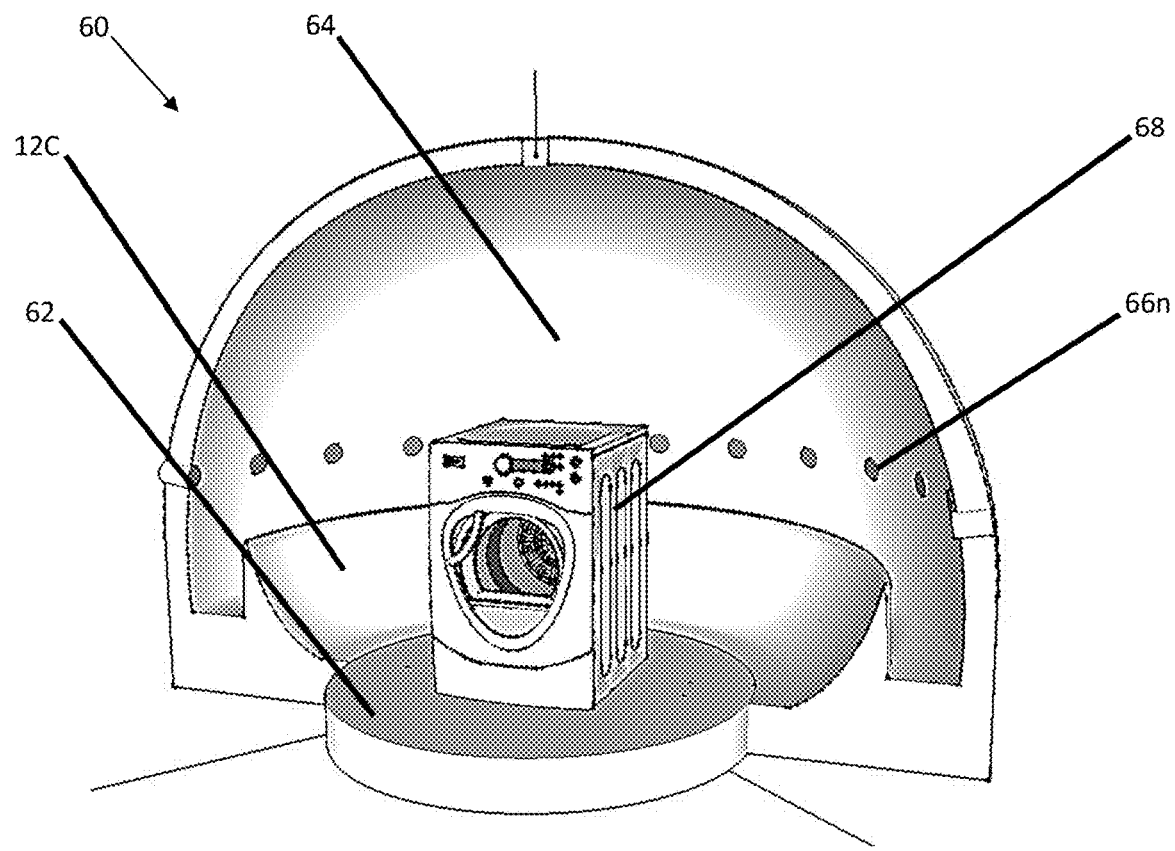
FIGS. 5A and 5B are partial cutaway views of a photographic system with a bowl-shaped concave photographic stage with an extending center column positioned at the base of the circular concave or bowl-shaped photographic stage surrounded by a dome with a camera array in accordance with an embodiment of the invention.
Figure 5B:
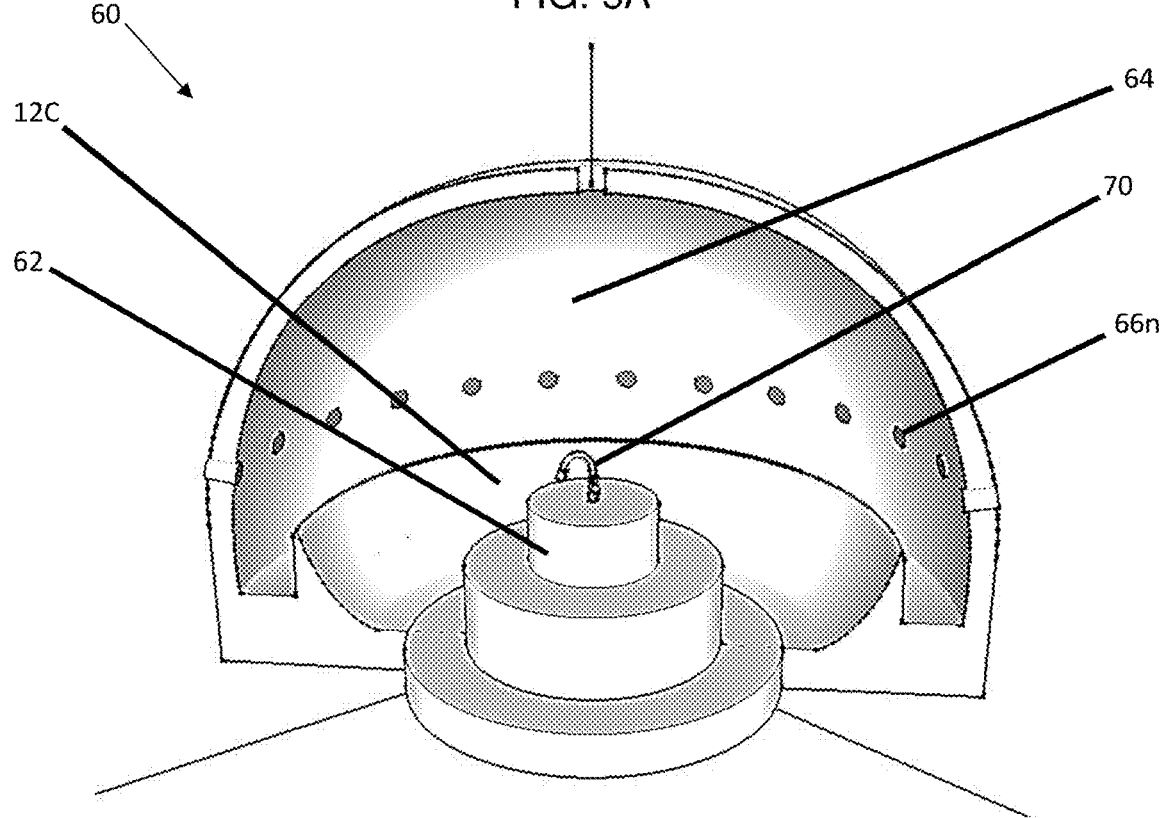

FIGS. 5A and 5B are partial cutaway views of a photographic system 60 with a bowl-shaped concave photographic stage 12C with an extending center column 62 positioned at the base of the circular concave or bowl-shaped photographic stage 12C surrounded by a dome 64 with a camera array 18n positioned behind apertures 66n. The apertures 66n may have shutters that are closed when each of the cameras 18n are not in use. The extending center column 62 positioned at the base of the circular concave or bowl-shaped photographic stage 12C may be used to keep the center of mass of an object in the center of the frame no matter the size of the object to be photographed. In FIG. 5A a large appliance such as a washer 68 is centered on an un-extended center column 62. In FIG. 5B a small object such as a faucet 70 is shown on an extended center column 62 in order to keep the faucet in the center of the photographic stage 12C. The dome 64 may be lined with a light reflecting material that bounces light from the diffusing screen toward the object to be photographed. The light reflecting material may be a light scattering sheet material such as a white canvas or gray walls, or a hard surface painted with a reflective paint.

Figure 6:
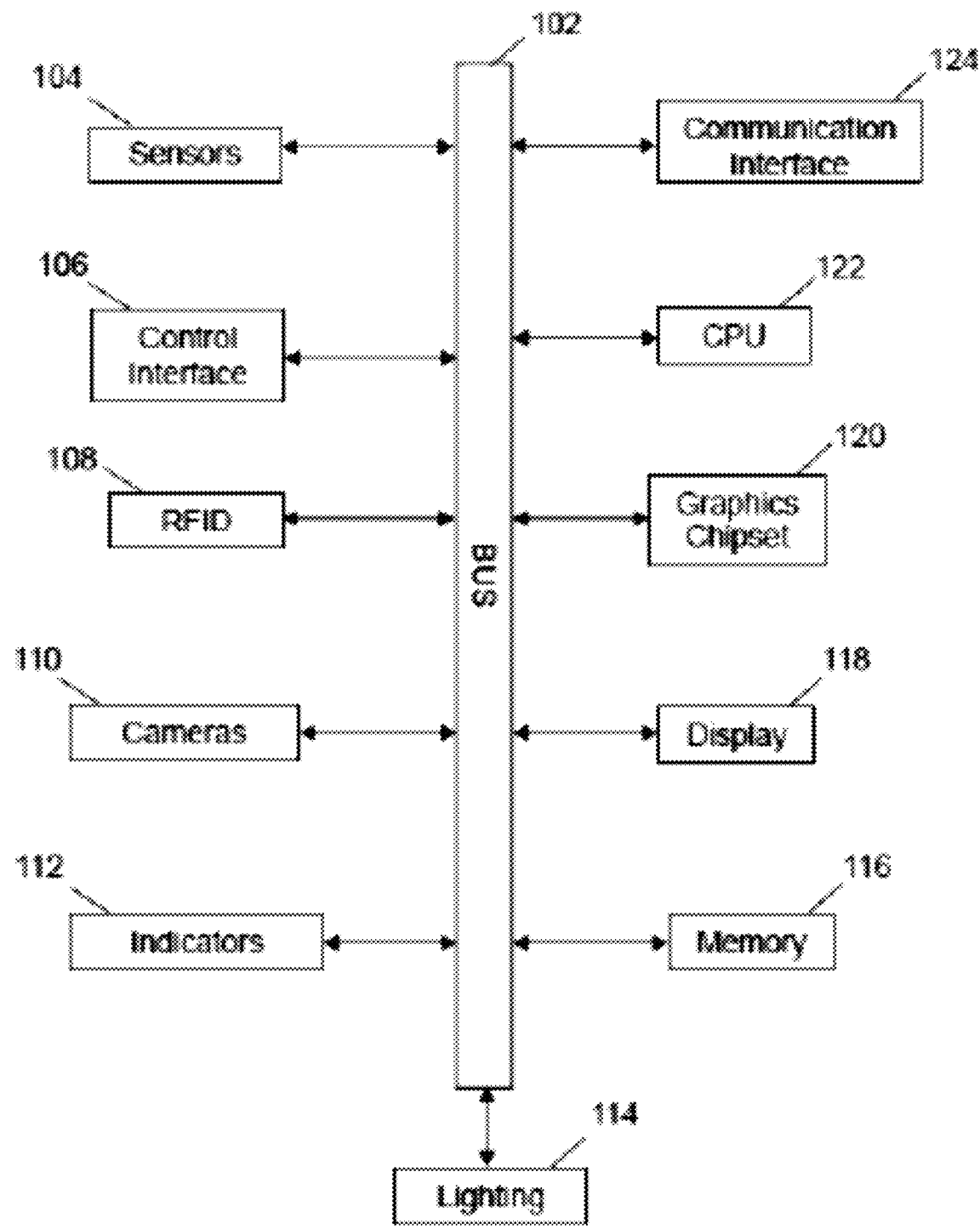
FIG. 6 is a system block diagram of the major components of the system of FIGS. 1A, 3, and 4.

FIG. 6 is a system block diagram 100 of the major components of a photographic system for photographing objects with a bowl-shaped photographic stage. As used herein, the term "bowl-shaped" refers to a spherical dome with an interior volume, a spherical cap representing a sphere intersected and cutoff by a plane. When the plane intersects the diameter of the spherical dome, this is termed a hemispheric dome. A central process unit (CPU) 122 in the controller 22 coordinates and controls the overall operation of the photographing system 100 that may be operated in the photographic stages disclosed above. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with object and client information is stored in Memory 116. Memory 116 is made up of ROM and random access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of an object and object position. RFID 108 is a reader that detects and interrogates tags that may be mounted to the object to be photographed. Cameras 110 and lighting 114 are controlled and sequenced by the CPU 122. Indicators 112 provide visual feedback to system users.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A photographic system comprising:
   a bowl-shaped photographic stage with a circular concave shape defining a volume, the volume adapted to retain an object or subject to be photographed within the circular concave shape, said bowl-shaped photographic stage having a floor;
   a light diffusing screen that casts omni-directional light on said bowl-shaped photographic stage, said light diffusing screen suspended above and with a gap over said bowl-shaped photographic stage; and
   one or more lamps positioned above said light diffusing screen and contributing to the omni-directional light.

2. The system of claim 1 further comprising an array of cameras positioned about a perimeter of said bowl-shaped photographic stage.

3. The system of claim 2 further comprising a computer based controller that individually fires the cameras that form the array, and said computer based controller obtains and stores a photographic image as each of the cameras in the array takes an image of the object.

4. The system of claim 3 wherein each of said cameras in the array is tethered to said controller.

5. The system of claim 3 wherein each of said cameras in the array are wirelessly connected to said controller.

6. The system of claim 1 wherein an inner surface of said bowl-shaped photographic stage is made of a light reflecting material that bounces the diffused light from the diffusing screen toward the object to be photographed.

7. The system of claim 6 wherein said light reflecting material is a light scattering sheet material comprising a white canvas or gray walls.

8. The system of claim 6 wherein said light reflecting material is a hard surface painted with a reflective paint.

9. The system of claim 1 further comprising a single movable camera positioned on a track that runs along a perimeter of said bowl-shaped photographic stage.

10. The system of claim 9 further comprising a computer based controller that moves the single camera form position to position along the track, and fires the camera to obtain and store a photographic image of the object.

11. The system of claim 10 wherein said movable camera is tethered to said controller.

12. The system of claim 10 wherein said movable camera is wirelessly connected to said controller.

13. The system of claim 1 wherein said bowl-shaped photographic stage rotates about its central axis.

14. The system of claim 1 further comprising a single fixed camera positioned on at a perimeter of said bowl-shaped photographic stage.

15. The system of claim 14 further comprising a computer based controller that rotates said bowl-shaped photographic stage form position to position about the axis, and fires the fixed camera to obtain and store a photographic image of the object or subject at each position of the rotating bowl-shaped photographic stage.

16. The system of claim 1 further comprising an extendable center column that height adjusts depending on the object to be photographed in order to keep the object centered in a photographic frame no matter the size of the object to be photographed.

17. The system of claim 1 wherein the dome further comprises a camera array positioned behind a set of aperatures in the dome, where the apertures each have a shutter that is closed when each of the cameras in the array are not in use.

18. A method of using the photographic system of claim 1 comprising:
   setting up a number of cameras in said camera array based on the required resolution of a rotational view to be obtained;
   positioning the object to be photographed in the center of said concave circular bowl-shaped photographic stage;
   taking the photographs; and
   supplying the photographs to a software package to form the rotational image.

19. A photographic system comprising:
   a bowl-shaped photographic stage with a circular concave shape defining a volume, the volume adapted to retain an object or subject to be photographed within the circular concave shape and on a pedestal stationary during photography of the object or subject;
   a light diffusing dome that casts omni-directional light on said bowl-shaped photographic stage;
   a set of camera apertures in said light diffusing dome; and
   one or more lamps positioned around said bowl-shaped photographic stage and contributing to the omni-directional light.

20. The photographic system of claim 19 wherein said pedestal is extendable vertically into said bowl-shaped photographic stage.

* * * * *